United States Patent [19]

James

[11] 4,069,543
[45] Jan. 24, 1978

[54] GLIDE CASTORS

[75] Inventor: Michael Joseph James, Cheltenham, England

[73] Assignees: Michael Joseph James; William Holroyd Thomas Baggs, both of Cheltenham, England

[21] Appl. No.: 696,949

[22] Filed: June 17, 1976

[30] Foreign Application Priority Data

June 28, 1975 United Kingdom ............... 27417/75

[51] Int. Cl.² ............................................. A47B 91/06
[52] U.S. Cl. ..................................... 16/42 R; 16/18 R
[58] Field of Search ............................. 16/42 R, 18 R

[56] References Cited

U.S. PATENT DOCUMENTS

| | | | |
|---|---|---|---|
| 3,186,025 | 1/1965 | Kesterton | 16/42 R |
| 3,345,675 | 10/1967 | Haydock | 16/45 |
| 3,858,271 | 1/1975 | Howard et al. | 16/42 R |

FOREIGN PATENT DOCUMENTS

| | | | |
|---|---|---|---|
| 1,013,033 | 12/1965 | United Kingdom | 16/42 R |

*Primary Examiner*—Werner H. Schroeder
*Assistant Examiner*—Conrad L. Berman
*Attorney, Agent, or Firm*—Cushman, Darby & Cushman

[57] ABSTRACT

A glide castor comprises a two-part body assembly consisting of lower and upper mouldings fitted together. The lower moulding has a convex bottom ground-engaging surface and an integral upstanding boss with a bore for a mounting spindle. The upper moulding is of cap-like form and seats on a peripheral seating on the lower moulding. An integral inwardly projecting lip of the upper moulding provides snap-on engagement with said boss, thereby to hold the two mouldings together as an assembly.

8 Claims, 3 Drawing Figures

GLIDE CASTORS

BACKGROUND OF THE INVENTION

This invention relates to non-rolling castors of the so-called glide or "slipper" type, having a body with a convex ground-engaging surface offset from a vertical pivot axis.

It is known for a castor of this type to have a castor body formed as an assembly of two plastics mouldings, namely a lower base member moulding and an upper cover member moulding. The lower moulding has an upstanding boss to receive a mounting spindle and around which the upper moulding is fitted and the upper moulding has an internal peripheral lip providing a snap-on fixing on engagement with an annular outer peripheral seating around the top surface of the lower moulding.

This prior construction suffers from two main disadvantages: firstly the peripheral rim of the upper moulding is of varying thickness which results in differential shrinkage and thus makes it difficult to hold close fixing tolerances; and secondly the lower moulding is of solid form and hence is expensive in terms of moulding material. The invention has for its object to provide a construction which materially reduces, or substantially eliminates, the fixing tolerance and shrinkage problems referred to and which, moreover, can be designed so as to effect a considerable economy in moulding material.

SUMMARY OF THE INVENTION

According to the invention a glide castor comprises a lower moulding with a convex bottom ground-engaging surface and an integral upstanding boss with a bore for a mounting spindle, and an upper cap-like moulding which seats on a peripheral seating on the lower moulding and which is formed for snap-on engagement with said boss thereby to hold the two mouldings together as a two-part body assembly.

As a result of the invention the upper moulding can be a shell of substantially uniform thickness, apart from the region surrounding and which snaps on to the boss, and this region can be formed as an internal boss which is of annular form and constant thickness. Thus the shrinkage and fixing tolerance problems of the prior construction can be obviated.

As the lower moulding of the invention merely has to provide a simple seating for the upper moulding this is provided around the periphery of the lower moulding which is conveniently of circular plan form, whereas in the prior construction a circular seating was required eccentric with respect to that periphery. The result is that the lower moulding can also be formed as a dished shell of more or less constant wall thickness, thereby effecting considerable economy in the moulding material used. Both mouldings may be of nylon or like plastics material, and the two mouldings may be of contrasting colours to provide a decorative effect.

The lower moulding may include strengthening webs between the boss and the wall of the moulding, thereby allowing a yet thinner shell to be used. A ring of such webs may be provided, for example twelve in number, each extending radially from the boss to the peripheral rim of the lower moulding.

The bore of the boss is preferably moulded with an internal projection or projections providing for retaining engagement with a grooved mounting spindle which thus has a snap-in fixing within the body assembly, thereby obviating the need for a fixing circlip or other separate fixing means as has previously been used. The fit of the spindle in the bore is preferably such that the body can pivot on the spindle, thereby allowing direct spindle fixing of the castor if desired, although if preferred a flanged or other fixing member can be mounted on the spindle according to the requirements of the user.

When a separate fixing member is employed this may also be pivotable on the spindle and the latter may have a second groove providing for snap-on fitting on the one hand into the castor body and, on the other hand, into the fixing member. The spindle grooving is then desirably symmetrical, rendering the spindle reversible so that it can be fitted either way round thereby facilitating mechanical handling and assembly.

Other objects and features of the present invention will appear more fully below from the following detailed description considered in connection with the accompanying drawings which disclose one preferred embodiment of the invention. It is to be expressly understood, however, that the drawings are designed for purposes of illustration only and not as a definition of the limits of the invention, reference for the latter purpose being had to the appended claims.

DESCRIPTION OF THE PREFERRED EMBODIMENT

Figure 1:
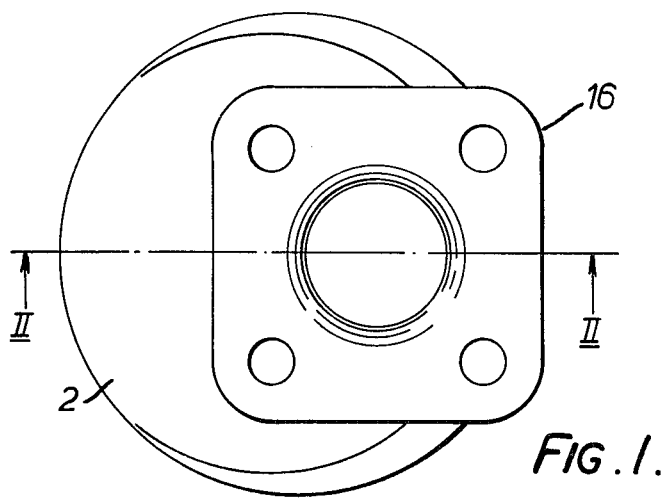
FIG. 1 is a plan view of a complete castor assembly.

The castor illustrated in the drawings has a two-part body assembly which comprises a lower plastics moulding 1 and an upper cap-like plastics moulding 2 which is a snap-on fit on the lower moulding. Both mouldings are circular in plan view and each is in the form of a dished shell with a substantially constant wall thickness; the moulding 1 has an upstanding boss 3 with a bore 4 for a mounting spindle 5, and a lower convex ground-engaging surface 6 which is a surface of revolution about an axis which is offset with respect to the pivotal mounting axis defined by the bore 4.

The rim of the moulding 2 engages a peripheral seating 7 provided by an annular rectangular shoulder at the periphery of the moulding 1. The annular shoulder is a complete annulus except in the region 7a furthest away from the boss 3. In that region it has a chordal portion to provide clearance for a downwardly tapering edge portion of the upper moulding 2. The snap-on engagement of the upper moulding 2 with the boss 3 is provided by an integral and inwardly projecting annular boss 8 which embraces the boss 3 and has a rib-like internal annular projection 9 which snaps past a lip-like peripheral thickening 10 at the free upper end of the boss 3. The boss 3 projects slightly proud of the upper surface of the moulding 2 and has a peripheral chamfer 11 providing a lead to assist snapping-on of the moulding 2.

Figure 2:
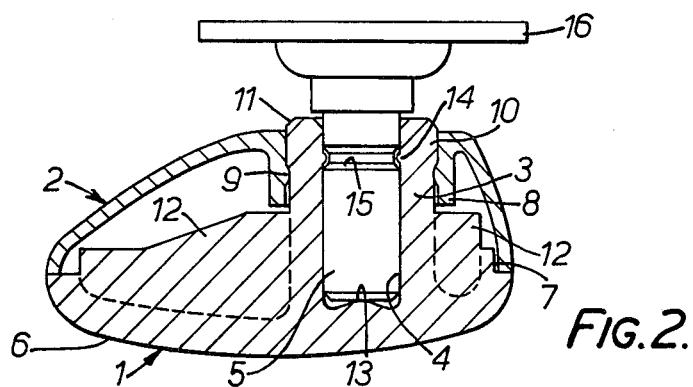
FIG. 2 is a side view with the castor body shown in section on the line II — II in FIG. 1.
Figure 3:
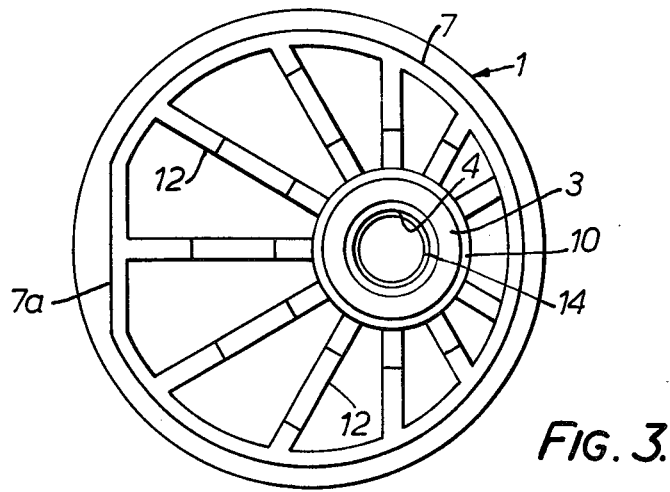
FIG. 3 is a detail plan view of a lower moulding of the two-part castor body.

To allow the shell of the lower moulding 1 to be of thin section, with attendant economy in expensive moulding material, a series of twelve strengthening ribs 12 are provided which are an integral part of the moulding and extend radially from the boss 3 to the outer peripheral rim of the moulding 1. As clearly shown in FIGS. 2 and 3, these webs have a stepped upper edge to provide a greater depth in the region of the boss 3 than in the region of the periphery of the moulding 1, this formation providing the required strength with high strength/volume ratio and hence economy in moulding material.

The fit of the spindle 5 in the bore 4 allows the two-part body 1,2 to turn on the spindle to provide the desired castor action, with the surface 6 gliding over the floor or other supporting surface. The blind end of the bore 4 has a convex domed surface 13 which provides an axial thrust bearing in respect of the vertical load supported by the castor. An internal rib-like annular projection 14 in the bore 4 engages a groove 15 in the spindle 5 and thereby provides a snap-in fixing of the latter with axial retention of the spindle, and flanged fixing means 16 are non-rotatably fixed on the spindle 5.

It will be appreciated that other forms of fixing means can be used which actually turn on the spindle 5, in which case the spindle may be reversible with two grooves for snap-in fixing, respectively, with the castor body and the fixing means. Alternatively, the fixing means may be omitted entirely when the user desires to employ direct spindle fixing of the castor.

I claim:

1. A glide castor comprising a lower moulding with a convex bottom ground-engaging surface, said lower moulding having an integral upstanding boss with a bore for a mounting spindle, and an upper cap-like moulding which seats on a peripheral seating on the lower moulding, said upper moulding being formed for snap-on engagement with said upstanding boss of said lower moulding thereby to hold the lower and upper mouldings together as a two-part body assembly; wherein said upper moulding is a shell of substantially uniform thickness apart from a region of the upper moulding surrounding and which snaps on to said upstanding boss fo said lower moulding; and wherein said region of the upper moulding is formed as an interval boss of annular form and constant wall thickness, said interval boss fitting closely around said upstanding bass of said lower moulding.

2. A castor according to claim 1, wherein said snap-on engagement of the two mouldings is provided by an inward projection of the upper moulding which snaps past a peripheral thickening adjacent the free upper end of the boss of the lower moulding.

3. A castor according to claim 1, wherein said peripheral seating is provided by a rectangular annular shoulder on the lower moulding, which shoulder is a complete annulus except in the region furthest away from said upstanding boss, where it has a chordal portion to provide clearance for a downwardly tapering edge portion of the upper moulding.

4. A castor according to claim 1, wherein said bore of the upstanding boss of the lower moulding is moulded with an internal projection or projections for retaining engagement with a grooved mounting spindle which thus has a snap-in fixing in the body assembly.

5. A castor according to claim 1, wherein said lower moulding is of circular plan form and is formed as a dished shell of more or less constant wall thickness.

6. A castor according to claim 5, wherein said lower moulding has integral strengthening webs between said upstanding boss and the dished wall of the lower moulding.

7. A castor according to claim 6, wherein a ring of said strengthening webs is provided, each extending radially from said upstanding boss to the peripheral rim of the lower moulding.

8. A castor according to claim 7, wherein each of said webs has a stepped upper edge to provide a greater depth in the region of said upstanding boss of the lower moulding than at the peripheral rim thereof.

* * * * *